(12) United States Patent
Dumas et al.

(10) Patent No.: US 8,418,178 B2
(45) Date of Patent: Apr. 9, 2013

(54) EVALUATION OF SYNCHRONIZATION GATEWAYS IN PROCESS MODELS

(75) Inventors: Marlon G. Dumas, Rapla (EE); Alexander Grosskopf, Berlin (DE); Thomas Hettel, Brisbane (AU); Moe T. Wynn, Brisbane (AU)

(73) Assignee: SAP AG, Walldorf (DE)

( * ) Notice: Subject to any disclaimer, the term of this patent is extended or adjusted under 35 U.S.C. 154(b) by 1341 days.

(21) Appl. No.: 11/944,258

(22) Filed: Nov. 21, 2007

(65) Prior Publication Data

US 2009/0133019 A1    May 21, 2009

(51) Int. Cl.
 *G06F 9/46* (2006.01)
 *G06Q 10/00* (2012.01)
(52) U.S. Cl. .................................... 718/100; 705/7.27
(58) Field of Classification Search ................. None
 See application file for complete search history.

(56) References Cited

U.S. PATENT DOCUMENTS

| | | | |
|---|---|---|---|
| 5,745,687 A | 4/1998 | Randell | |
| 6,397,192 B1 | 5/2002 | Notani et al. | |
| 6,567,783 B1 | 5/2003 | Notani et al. | |
| 6,920,366 B1 | 7/2005 | Luh et al. | |
| 7,051,071 B2 | 5/2006 | Stewart et al. | |
| 7,069,536 B2 | 6/2006 | Yaung | |
| 7,072,807 B2 | 7/2006 | Brown et al. | |
| 7,162,509 B2 | 1/2007 | Brown et al. | |
| 7,168,077 B2 | 1/2007 | Kim et al. | |
| 7,200,530 B2 | 4/2007 | Brown et al. | |
| 7,240,324 B2 | 7/2007 | Casati et al. | |

OTHER PUBLICATIONS

Forte Fusion Process Development Guide Release 2.1 Sun Microsystems Chapters 1, 7, and 9 Year of Publication: 2000.*
Towards EPC Semantics based on State and Context Jan Mendling and Wil van der Aalst Proceedings of the 5th EPC Workshop EPK 2006 pp. 25-48 Year of Publication: 2006.*
Semantics of Standard Process Models with OR-Joins Marlon Dumas, Alexander Grosskopf, Thomas Hettel, and Moe Wynn Published: Nov. 2007.*
Wynn, Moe T., et al., "Achieving a General, Formal and Decidable Approach to the OR-join in Workflow using Reset nets", Lecture Notes in Computer Science, Application and Theory of Petri Nets 2005, International Conference on Applications and Theory of Petri Nets No. 26 (Jun. 20, 2005), vol. 3536, pp. 423-443, Miami, FL.
Kindler, Ekkart "On the Semantics of EPCs: A Framework for Resolving the Vicious Circle", International Conference on BPM 2004, Lecture Notes in Computer Science vol. 3080, Berlin, Germany 2004, (Jun. 2004), pp. 82-97.

(Continued)

*Primary Examiner* — Emerson Puente
*Assistant Examiner* — Paul Mills
(74) *Attorney, Agent, or Firm* — Brake Hughes Bellermann LLP

(57) ABSTRACT

A system may include a thread monitor that is arranged and configured to monitor progress of multiple threads of a workflow process at a synchronization point with each of the threads having a state, and configured to generate at least one inspection trigger for inspection of the threads. A thread inspector may inspect the threads at the synchronization point for a change in the state in any of the threads in response to the inspection trigger. A firing rules engine may determine whether or not the synchronization point should fire based at least in part on the change in the state of at least one of the threads.

15 Claims, 7 Drawing Sheets

OTHER PUBLICATIONS

Cuntz, Nicolas et al., "On the Semantics of EPCs: Efficient Calculation and Simulation", BPM 2005, LNCS 3649, (Jun. 2005), pp. 398-403.

Mendling, Jan et al., "Formalization and Verification of EPCs with OR-Joins Based on State and Context", CAiSE 2007, LNCS 4495, (Jun. 2007), pp. 439-453.

Kindler, Ekkart "On the semantics of EPCs: Resolving the vicious circle", Data & Knowledge Engineering 56, (2006), pp. 23-40.

Van Der Aalst, Wil et al., "On the semantics of EPCs: A vicious circle", Proceedings of the EPK 2002; Business Process Management with Event drive Process Chains, Trier, Germany, Nov. 2002, pp. 71-80.

Cuntz, Nicolas et al., "On the semantics of EPCs: Faster calculation for EPCs with small state spaces", Proceedings of Fourth Workshop on Event-Driven Process Chains (WI-EPK 2005), Hamburg, Germany, Dec. 2005., pp. 7-23.

Wynn, Moe T., "Semantics, Verification, and Implementation of Workflows with Cancellation Regions and OR-joins", Dissertation submitted for the degree of IF49 Doctor of Philosophy, (Nov. 2006).

Van Dongen, B. F., et al., "Structural Patterns for Soundness of Business Process Models", Enterprise Distributed Object Computing Conference, 2006. EDOC '06. 10th IEEE International, (Oct. 2006), pp. 116-128, Hong Kong.

Ouyang, Chun et al., "Pattern-based Translation of BPMN Process Models to BPEL Web Services", International Journal of Web Services Research, http://eprints.qut.edu.au, (2007).

Verbeek, H.M.W. et al., "Verifying Workflows with Cancellation Regions and OR-joins: An Approach Based on Invariants", Beta Working Paper Series, WP 156, Eindhoven University of Technology, Eindhoven, The Netherlands, 2006., (2006).

Ouyang, Chun et al., "From Business Process Models to Process-oriented Software Systems: The BPMN to BPEL Way", Technical Report BPM-06-27, BPMcenter.org, 2006. http:is.tm.tue.nl/staff/wvdaalst/BPMcenter/reports/2006/BPM-06-27.pdf, (2006).

Ouyang, Chun et al., "Translating BPMN to BPEL", http://eprints.qut.edu.au, (2006).

Maruta, T. et al., "A deadlock detection algorithm for business processes workflow models", 1998 IEEE International Conference on Systems, Man, and Cybernetics, vol. 1, (Oct. 11, 1998),611-616.

Wohed, P. et al., "Pattern-based Analysis of BPMN—An extensive evaluation of the Control-flow, the Data and the Resource Perspectives", BPM Center Report BPM-05-26, www.BPMcenter.org (2005).

* cited by examiner

EVALUATION OF SYNCHRONIZATION GATEWAYS IN PROCESS MODELS

TECHNICAL FIELD

This description relates to the evaluation of synchronization gateways in process models.

BACKGROUND

Modeling languages may be used as meta-languages to describe and execute underlying processes, such as business processes. For example, process modeling languages allow an enterprise to describe tasks of a process, and to automate performance of those tasks in a desired order to achieve a desired result. For instance, the enterprise may implement a number of business software applications, and process modeling may allow coordination of functionalities of these applications, including communications (e.g., messages) between the applications, to achieve a desired result. Further, such process modeling generally relies on language that is common to, and/or interoperable with, many types of software applications and/or development platforms. As a result, process modeling may be used to provide integration of business applications both within and across enterprise organizations.

Thus, such modeling languages allow a flow of activities or tasks to be graphically captured and executed, thereby enabling resources responsible for the activities to be coordinated efficiently and effectively. The flow of work in a process is captured through routing (e.g., control flow) constructs, which allow the tasks in the process to be arranged into the required execution order through sequencing, choices (e.g., decision points allowing alternative branches), parallelism (e.g., tasks running in different branches which execute concurrently), iteration (e.g., looping in branches) and synchronization (e.g., the coming together of different branches).

In the context of such processes, as just referenced, it may be that one or more of the constructs in the process model may be computationally complex or otherwise difficult to evaluate. For example, one or more types of synchronization points in the process model may be computationally complex or otherwise difficult to evaluate because of the number of branches and predecessor branches converging at a point. Also, different types of synchronization points may be configured to be enabled based on different parameters. For instance, one type of synchronization point such as an inclusive merge gateway (hereinafter called the OR-join) may depend on the presence or absence of events in places in the process model that are far away from the synchronization point.

Further, in real-world scenarios, it may occur that the enablement of the synchronization point may be unnecessarily delayed because of the computationally complex nature of evaluating whether or not the process may proceed beyond the synchronization point, thus delaying the execution of subsequent tasks. For example, a business process model may include multiple tasks, executing in parallel, that are each related to processing and checking shipment feasibility for purchase orders, and that converge at a synchronization point. The synchronization point may or may not need to wait on all of the incoming tasks to complete before proceeding to subsequent tasks. It may be that subsequent tasks may be completed without all of the preceding tasks in the process being completed, because some tasks may be unreachable. However, the subsequent tasks may be unnecessarily delayed if the synchronization point is not enabled because it is waiting on a task to complete, where the task is no longer active or may be unreachable. For example, as different shipping options are evaluated, one type of shipping option task may not be attainable, yet the entire process may be delayed if the fact that a particular shipping option is not attainable cannot be evaluated in a timely manner. Consequently, for example, subsequent tasks, such as allocating an order to shipment, may be significantly delayed.

Frequently, it may be difficult or problematic to express and evaluate such synchronization points in a manner that is executable as a process model. Thus, in these and other cases, process models may fail or be limited in their goal of expressing real-world processes in a flexible, repeatable, computer-executable manner.

SUMMARY

According to one general aspect, a system may include a thread monitor that is arranged and configured to monitor progress of multiple threads of a workflow process that converge at a synchronization point with each of the threads having a state. The thread monitor may generate at least one inspection trigger for inspection of the threads. The system may further include a thread inspector that is arranged and configured to inspect the threads at the synchronization point for a change in the state in any of the threads in response to the inspection trigger and a firing rules engine that is arranged and configured to determine whether or not to fire the synchronization point based at least in part on the change in the state of at least one of the threads. In one exemplary implementation, the synchronization point may include an OR-join.

According to another general aspect, a computer program product may be used for evaluating synchronization points in process models, the computer program product being tangibly embodied on a computer-readable medium and including executable code that, when executed, is configured to cause at least one data processing apparatus to execute an orchestration engine. The orchestration engine may be configured to monitor progress of multiple threads of a workflow process at a synchronization point, with each of the threads having a state, generate at least one inspection trigger for inspection of the threads, inspect the threads at the synchronization point for a change in the state in any of the threads in response to the inspection trigger, and determine whether or not to fire the synchronization point based at least in part on the change in the state of at least one of the threads. In one exemplary implementation, the synchronization point may an OR-join or may include a synchronization point that may exhibit behavior similar to that of an OR-join. In this example, the OR-join or the synchronization point that behaves like an OR-join may wait for at least one thread to be completed, and for the remaining threads to be in a state where they have completed or they can no longer complete.

The details of one or more implementations are set forth in the accompanying drawings and the description below. Other features will be apparent from the description and drawings, and from the claims.

DETAILED DESCRIPTION

Figure 1:
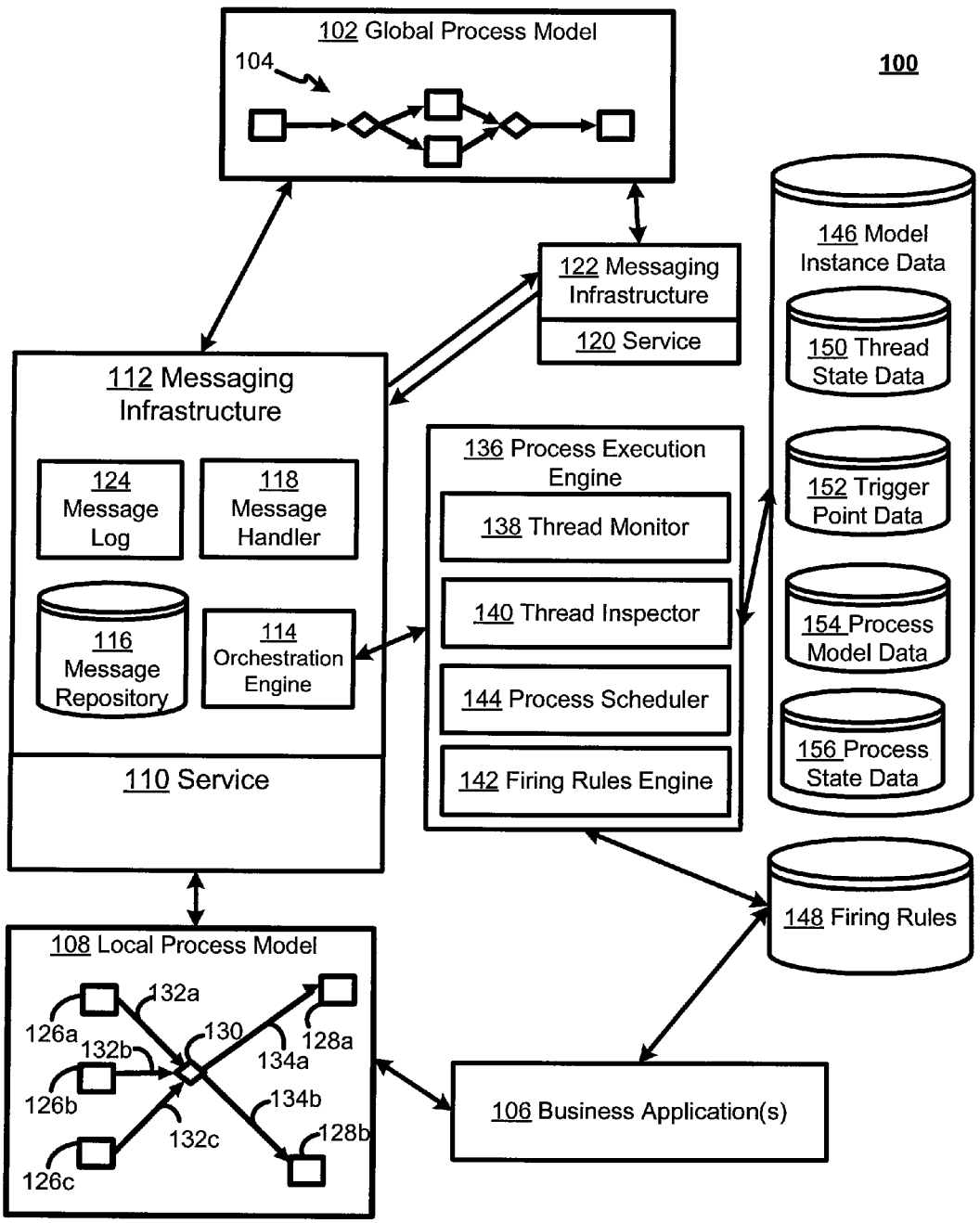
FIG. 1 is a block diagram of a system for evaluating synchronization points in process models.

FIG. 1 is a block diagram of a system 100 for evaluating synchronization points in process models. For example, the system 100 allows for evaluation of OR-joins or other complex joins in a manner that monitors and evaluates incoming threads to the OR-join and allows for a determination of whether or not to execute or fire the OR-join, such that subsequent tasks may be completed in a timely manner. In one example, the OR-join is a synchronization gateway in the process model where several branches or threads converge. For each of the incoming threads, the OR-join will normally wait for a token indicating the completion of that thread. But if at some point in time it can be determined that no token will ever arrive along a given incoming thread, the OR-join does not need to wait for a token along that thread and may be enabled. For example, the system 100 may monitor the progress of multiple threads of a workflow process at a synchronization point and generate an inspection trigger for inspection of the threads. The threads may be inspected for a change in state in any of the threads in response to the inspection trigger and the synchronization point may be evaluated whether or not to fire based at least in part on the change in the state of at least one of the threads. Consequently, the system 100 provides workflow designers and users with the ability to implement workflow process models in a manner that more accurately and completely reflects real-world usage scenarios of synchronization points, such as OR-joins or other complex joins.

In other exemplary implementations, the synchronization point include a synchronization point that may exhibit behavior similar to that of an OR-join. In this example, the synchronization point that behaves like an OR-join may wait for at least one thread to be completed, and for the remaining threads to be in a state where they have completed or they can no longer complete.

In the example of FIG. 1, a global process model 102 represents a business process model that is implemented, and agreed on, by a number of collaborating service providers, such that the service providers perform tasks 104 of the global process model 102. The service providers may make pre-arrangements regarding their interactions with one another (e.g., arrangements governing messages, message formats, or message types, as well as arrangements governing an order of the messages to be sent and/or tasks to be performed). By way of specific example, a purchase order may be sent by one service provider that may require either acknowledgement or rejection by one or more other service provider(s). The global process model 102 (also referred to as a global choreography model) thus provides a way of capturing, contractualizing, and implementing potentially complex and long-running message exchange sequences between service providers, in order to execute a desired business process.

For example, a business application 106 may be built and implemented by an enterprise or other entity to perform some business functionality, such as, for example, creating a purchase order and sending the purchase order or loan request to a number of (possibly competing) suppliers. The business application 106 may implement a local process model 108 that, analogously to the global process model 102, formalizes and defines the roles of the business application 106 within the global process model 102, e.g., with respect to the purchase order or loan request example(s) just mentioned. For example, the local process model 108 may describe what types of messages may or should be exchanged with the suppliers as part of the purchase order.

In the example of FIG. 1, tasks of the global process model 102 and the local process model 108 are executed at least in part using application services. For example, the business application 106 and the local process model 108 may be associated with at least one service 110. In this context, the service 110 refers to an application having one or more specific functionalities that are exposed to other applications, often over a network (e.g., the Internet) by way of a service interface (where an operation and use of the interface may be known or determined, as needed). When such a service (and/or an interface of the service) is exposed/available over the World Wide Web (referred to herein as the WWW or the web), then the service may be known as a web service.

Using such services and service interactions to implement process models may be referred to as a service-oriented architecture (SOA), in which, as just described, process tasks result in execution of the services. Further, processes that rely on services to realize process steps may themselves be deployed and accessed as services, which may be referred to as process-based service composition. Languages exist, such as, for example, the Business Process Execution Language (BPEL), that are designed to provide such compositions of services (e.g., web services), and thus provide a top-down, process-oriented approach to the SOA. Accordingly, BPEL or other such languages (such as, for example, the Web Services Flow Language (WSFL), the eXtensible language (XLANG), and/or the Business Process Modeling Language (BPML)), or modifications/extensions thereof, may be used to define the global process model 102 and/or the local process model 108.

In FIG. 1, in order to integrate the service 110 within the global process model 102, a messaging infrastructure 112 is included. Generally, the messaging infrastructure 112 facilitates instantiation and execution of the local process model 108. The messaging infrastructure 112 includes an orchestration engine 114 that is operable, among other functions, to execute an instance of the local process model 108. For example, the orchestration engine 114 may be in charge of ensuring that a given task of the local process model 108 has actually been executed and completed, before allowing the instance to proceed to a following task. Other functions and examples of the orchestration engine 114 are described in more detail, below.

A message repository 116 represents a database or other memory that may be used, for example, to store message types or templates, as well as actual messages (including both outgoing and/or incoming messages). For example, as described in more detail below, the message repository 116 may include a number of message types that are specific to, or associated with, (functionality of) the business application 106. For instance, in the case where the business application 106 is used to generate purchase orders, there may be a number of associated message types in the message repository 116, which may be pre-configured to some extent based on, for example, a type of purchase order or an identity of the recipient(s) of the purchase order.

A message handler 118 may be used to send and receive actual messages of the messaging infrastructure 112 during communications with other services, such as a service 120 having messaging infrastructure 122. For example, in a case where the orchestration engine 114 is executing a plurality of instances of the local process model 108, the message handler 118 may be responsible for sending messages of the various instances to the appropriate recipients, using appropriate transmission techniques and/or protocols. Conversely, for incoming messages, the message handler 118 may be used to sort and/or route messages to appropriate portions of the messaging infrastructure 112, the service 110, and/or the business application 106.

The message handler 118 also may serve as a buffer or queue for incoming and outgoing messages. In this regard, for example, the message handler 118 may serve as a queue for incoming messages, which may ultimately be forwarded to a message log 124. The message log 124 may be used to track each incoming (and outgoing) message(s), and, ultimately, persist the messages to the message repository 116.

Thus, for example, the process model 108 may describe tasks to be performed, as well as messages that may be sent/received as part of such tasks, by a manufacturer as part of a manufacturing process, or by some other party/entity. As referenced above, such process models generally include a plurality of nodes or tasks that are joined and ordered to obtain a desired result. That is, as illustrated by the example process model 108 illustrated in FIG. 1 (which is intended merely as a conceptualization or illustration of a process model having multiple synchronizations, and not intended necessarily to represent a particular process model being executed in FIG. 1), nodes/tasks may be joined by appropriate edges (arrows) and control tasks (e.g., splits and/or joins) to obtain structures including parallel tasks, iterative tasks, nested loops, or other known task progressions.

In particular, the process model 108 conceptually illustrates a simplified example in which some or all of three parallel tasks 126a, 126b, 126c are synchronized and result in one or more subsequent tasks 128a, 128b. Synchronization is illustrated as occurring at a synchronization point 130, which may represent or be implemented by a gateway or similar workflow construct, examples of which are discussed in more detail, below. As shown, the tasks 126a, 126b, 126c are respectively associated with branches 132a, 132b, 132c (hereinafter referred to interchangeably as branches or threads). For example, although the simplified process model 108 of FIG. 1 illustrates a single task associated with each branch 132a, 132b, 132c, it will be appreciated that, in practice, a number of tasks may exist that are respectively associated with the branches 132a, 132b, 132c. Similarly, the subsequent tasks 128a, 128b are illustrated as being respectively associated with branches 134a, 134b.

An example of the process model 108 may include a process for fulfilling, scheduling and delivering goods related to multiple purchase orders, where each purchase order is associated with one of the branches 132a, 132b, 132c. That is, three purchase orders may be sent in parallel to a company for fulfilling and delivering. It may be desirable to fulfill all of the orders and process them in a single shipment. As such, a synchronization point 130 may be configured to wait for each of the purchase orders on each of the branches 132a, 132b, 132c before triggering subsequent branches, such as branches 134a, 134b. However, if it can be determined that one or more of the branches 132a, 132b, 132c will never be completed then the synchronization point 130 may fire or continue so as not to delay shipment of the other purchase orders that can be fulfilled. For example, the current state of the branches 132a, 132b, 132c may be monitored and upon fulfilling one of the purchase orders (e.g., branch 132a completes), an inspection of the other branches (e.g., branches 132b, 132c) may be initiated, while the synchronization point 130 is placed on a hold. If the inspection results in a determination that the other branches 132b, 132c are still active such that they may reach a state of fulfilling the purchase orders, then the synchronization point 130 may remain on hold and continue to wait for the other branches 132b, 132c to complete the purchase orders. If, however, the inspection results in a determination that the other branches 132b, 132c are in an unreachable state, meaning that the branch will never reach a state of completion, then the hold may be lifted from the synchronization point 130 and the fulfillment and delivery of the filled purchase order on branch 132a may continue to a subsequent branch(s) 134a, 134b so shipment of the filled purchase order is not unnecessarily delayed.

Each of the branches 132a, 132b, 132c may be associated with and go through various states. For example, the state of a branch may include a completed state in which the branch has completed its tasks and delivered its token. The state of a branch may include an active state in which the branch may eventually reach a state of completion. For example, a branch in the active state may still be executing its tasks, but not yet completed the tasks, yet it is anticipated that the branch may eventually complete the tasks. Furthermore, the state of a branch may include an unreachable state, meaning that the branch will never reach a state of completion. In the purchase order and shipping example given above, a branch may enter an unreachable state when, for instance, a purchase order is canceled. In this situation, the branch will never reach a state of completion because the purchase order was canceled.

In this context, it may be appreciated that the branches 132a, 132b, 132c may include more complex threads and additional synchronization points within a given instance of the local process model 108, as is shown below in FIGS. 5A and 5B. Moreover, triggers other than the completion of a thread may be used to initiate an inspection of the threads for a potential change of state. In some cases, the same branch may be used multiple times within a given instance of the local process model 108, yet other branches may be used fewer times. Still further, in the example cases where the synchronization point is an OR-join, it may not be sufficient to examine the presence of tokens in its immediate vicinity. Instead, enablement of the OR-join may depend on the presence or absence of tokens in places far away in the process model 108. Still further, in the example cases where the synchronization point is an OR-join, the state of enablement of the OR-join may depend on the state of enablement of another OR-join in the model and vice-versa. In one exemplary implementation, an OR-join may be enabled if there is at least one token in one of its incoming branches, and for each of its incoming branches the incoming branches either has at least one token or, assuming the OR-join will not fire, that no token will arrive to flow through a sequence of firings starting from the current state. These and other considerations may be taken into account by the system 100 when evaluating synchronization points in process models 108.

For example a process execution engine 136 may be used by, or in conjunction with, the synchronization point 130 to evaluate the synchronization point 130 in the local process model 108. For example, the process execution engine 136 may be spawned by the orchestration engine 114 when a process instance is created or at a later point in time. As referenced above, the synchronization point 130 may be implemented as a gateway construct such as, for example, an OR-join or a complex join or other constructs known within existing process modeling and/or execution languages, so that, in some example implementations, the process execution engine 136 may be spawned by the orchestration engine 114 and implemented within such a gateway. This ability of the process execution engine 136 to perform evaluations of synchronization points allows the system 100, as referenced above, to contemplate and execute a variety of real-world scenarios using OR-join and other complex gateways, examples of which are described herein, and which may include purchase order processing or business tendering, or other examples in which a number of interactions are required through different and distributed actors (e.g., external parties).

In practice, the process execution engine 136 may include a thread monitor 138, a thread inspector 140, a firing rules engine 142, and a process scheduler 144. In the process of evaluating synchronization points, the process execution engine 136 and its modules may access model instance data 146 as well as firing rules 148. In this context, the model instance data 146 may refer, for example, to virtually any data that is specific to, or associated with, evaluating synchronization points in the process model 108. For example, the model instance data 146 may be associated with state data regarding a current state of a branch 132*a*, 132*b*, 132*c*, or other process model and/or workflow processing data associated with evaluating synchronization points of the process model 108. The model instance data 146 may include thread state data 150, trigger point data 152, process model data 154 and process state data 156.

In practice, the process execution engine 136 may instantiate the thread monitor 138 to monitor progress of some or all of the multiple threads (e.g., branches 132*a*, 132*b*, 132*c*) of a workflow process that converge at a synchronization point 130 and to generate one or more inspection triggers for inspection of the threads. The thread monitor 138 tracks the progress of the multiple threads and populates the thread state data 150 with the information about the progress of the threads. The thread monitor 138 may refer to the trigger point data 152 to determine if and/or when to generate the inspection triggers. For example, the thread monitor 138 may monitor the progress of the branches 132*a*, 132*b*, 132*c* and populate the thread state data 150 with information such as a current state of each of the branches 132*a*, 132*b*, 132*c*. The thread monitor 138 may check the current state or other information relating to the branches 132*a*, 132*b*, 132*c* and use that information to lookup the trigger point data 152 to determine whether or not to generate an inspection trigger.

The trigger point data 152 may include information about different types of triggers that a particular instance of a process model may use to determine when to generate an inspection trigger. For example, a trigger point may be when at least one of the branches 132*a*, 132*b*, 132*c* reaches a completed state. In the shipping and delivery example provided above, a trigger point was reached when branch 132*a* completed its purchase order. Another trigger point may be when multiple branches 132*a*, 132*b*, 132*c* reach a completed state. For example, the business process may deem it efficient to wait to generate an inspection trigger until at least two of the branches 132*a*, 132*b*, 132*c* have completed purchase orders before an inspection of any remaining branches would be initiated. Other types of trigger points are possible including, for example, when a particular type of thread completes, when a particular type of combination of threads complete, or when any thread reaches a particular state. Still, further types of trigger points may include configurable temporal limitations, manual triggers and/or trigger points based on events external to the process model 108.

Once the thread monitor 138 generates an inspection trigger, then the thread inspector 140 may inspect the threads at the synchronization point 130 for a change in the state in any of the threads. The thread inspector 140 may reference the thread state data 150, which may have been populated by the thread monitor 138, and the process model data 154 prior to, during, and/or after inspecting the threads to aid in the inspection process. The process model data 154 may contain information relating to the architecture and structure of the process model 108. The structure of the process model provides relevant information about each object (e.g., task, branch, synchronization point) in the process model in the region of the synchronization point 130, including enablement information for the particular type of object. For example, the process model data 154 may contain enablement rules that define when an object may be enabled and thus, may still be in an active state. The enablement rules contained in the process model data also may provide information that defines when an object may never be enabled and thus, may be in an unreachable state. The thread inspector 140 may access this data to assist in determining a change in the state of any threads and/or the potential for a change in the state of the threads.

In the example of FIG. 1, once the branch 132*a* changes to a completed state, the thread monitor 138 generated an inspection trigger that spawned the thread inspector 140 to inspect the other branches 132*b*, 132*c* for a change in the state of the those branches. The thread inspector 140 may determine whether any of the branches may eventually be enabled and/or are still in an active state based at least in part on the structure and architecture of the incoming branch as looked-up in the process model data 154. Thus, the thread inspector 140 may compute the set of predecessor objects along each empty (i.e., no token at the synchronization point 130) branch and then iterate over this set of predecessor objects to determine if the branch is in an active state. Thus, the complexity of the inspection by the thread inspector 140 may be based upon the total number of elements in the process model.

In one exemplary implementation, the thread inspector 140 may use one function to inspect branches that do not contain any OR-joins. For each element in the branch, the thread inspector 140 may determine whether or not the branch is active by applying the enablement rules from the process model data 154 for that particular type of object. For example, for the branches 132*a*, 132*b*, 132*c* that may include other types of objects such as, for instance, AND-joins, XOR-joins, or other objects, the thread inspector 140 may use the enablement rules for that particular type of object to determine the potential for a change in the state of the object.

The thread inspector 140 may use a second different function to inspect branches that contain at least one OR-join in the branch. An OR-join for which the state or enablement needs to be determined may not actually need to know whether a preceding OR-join is enabled or not. Instead, the thread inspector 140 may inspect whether there is at least one token in at least one incoming branch of a preceding OR-join and there is at least one token in each incoming branch of the preceding OR-join that is part of a path starting at the OR-join and finishing at the preceding OR-join. For example, for the branches 132*a*, 132*b*, 132*c* that may include a preceding OR-join as part of the branch, then the thread inspector 140 may inspect the branch to determine if a change in state may occur by evaluating whether there is at least one token in at least one of the incoming branches to the preceding OR-join and to determine whether or not there is at least one token in each incoming branch of the preceding OR-join that is part of a path starting at the synchronization point 130 and finishing at the preceding OR-join.

The thread inspector 140 may or may not use a recursive process to inspect the branches for a change in the state of any of the threads. For example, once the thread monitor 138 generates an inspection trigger, the thread inspector 140 may continuously inspect one or more of the branches 132a, 132b, 132c for a change in the state in any of the branches using one or more of the functions, as described above. Additionally and/or alternatively, once the thread monitor 138 generates an inspection trigger, the thread inspector 140 may conduct a single inspection of one or more of the branches 132a, 132b, 132c for a change in the state in any of the branches and then wait for other indicia such as, for example, another inspection trigger that may be generated by the thread monitor 140.

The thread inspector 140 may use one or more variants when inspecting the branches according to the different functions, as described above. In one exemplary implementation, the thread inspector 140 may use a variant that looks backwards from the synchronization point 130 at the branches to apply the functions to the branches to determine a potential for a change in state of the branches. In another exemplary implementation, the thread inspector 140 may use a variant that looks forward from the synchronization point 130 at the branches to apply the functions to the branches to determine a potential for a change in state of the branches. Still in other exemplary implementations, the thread inspector 140 may use a combination of the variants that both looks backwards and forwards from the synchronization point 130 to apply the functions to the branches to determine a potential for a change in the state of the branches.

The firing rules engine 142 may use the information obtained during the inspection of the branches by the thread inspector 140 to determine whether or not the synchronization point 130 should fire. The firing rules engine 142 may use the information from the thread inspector 140, along with the firing rules data 148, to determine whether or not the synchronization point 130 should fire. In the example of FIG. 1, if the thread inspector 140 determines the state of the non-completed branches is unreachable, then the firing rules engine 142 may fire the synchronization point 130. If the thread inspector 140 determines the state of at least one of the non-completed branches is active, then the firing rules engine may continue to hold the synchronization point 130 such that it does not fire, as discussed in more detail below with respect to FIG. 6.

The firing rules data 148 may refer to data that are associated with the executing instance of the process model 108 and/or may refer to data associated with a particular structure or architecture of an object in the process model 108. Meanwhile, in a business-related example, such firing rules 148 may be considered to be business rules, and may include how to process purchase order and schedule delivery and shipment of goods associated with the purchase orders. The firing rules 148 also may determine if all, some or none of the branches emanating from the synchronization point will be executed after the synchronization point is fired. For example, if one of the synchronized threads completed successfully, and two others did not reach a state of completion, the firing rules 148 may determine that only one branch should be executed and not the other(s).

The firing rules engine 142 also may use information contained in the process state data 156 to determine whether or not the synchronization point 130 should fire. The process state data 156 may contain information related to the overall state of the local process model 108. The process state data 156 may contain information about the state of the branches following inspection and may include indicia of the state using one or more types of indicators. For example, the process state data 156 may include a color indicator that indicates the particular state of a thread. For instance, red may be used to mark a thread as complete, blue may be used to mark a thread as active, and green may be used to mark a thread as unreachable. Other indicators may be used. The firing rules engine 142 may use the information contained in the process state data 156 to look up the rules for when to fire the synchronization point 130 in the firing rules data 148. The firing rules data 148 may contain different firing or must wait scenarios based on different combinations of thread states as marked by the indicators in the process state data 156.

The process scheduler 144 may be configured to update an overall state of the process model and/or configured to update a state of the synchronization point 130. For example, the process scheduler 144 may mark the state of the branches using one or more of the example indicators, as discussed above, following the evaluation by the thread inspector. In one exemplary implementation, the process scheduler 144 may modify the behavior of the synchronization point 130 based on the updates to the process state data 156.

The process scheduler 144 may be used such that an overall incremental evaluation of the synchronization point 130 may be performed. The use of an incremental evaluation by the process execution engine 136 may reduce and/or eliminate the need for multiple recursive iterations of the monitoring and inspection process. In the example of FIG. 1, if one of the branches complete, (e.g., branch 132a), then the process scheduler 144 may mark the branch 132a as red in the process state data 156. The other non-completed branches 132b, 132c may be marked as appropriate following inspection by the thread inspector 140. For instance, if branch 132b is in an unreachable state, then the process scheduler 144 may mark branch 132b as green in the process state data 156. If branch 132c is in an active state, then the process scheduler 144 may mark branch 132c as blue in the process state data 156. Since, in this example, one of the branches 132c is still active, the firing rules engine 142 will not fire the synchronization point 130a. Upon the next inspection by the thread inspector 140, the thread inspector 140 may have to inspect fewer than all of the branches using the information from the process state data 156. Specifically, in this example, since branch 132a is marked as complete and branch 132b is marked as unreachable, the thread inspector 140 does not need to inspect these branches and may just inspect branch 132c, thus reducing the need for multiple iterations and inspections of certain branches.

As referenced above, a number of different types of languages may be used both to design/create process models, and also to execute the process models, such as the process model 108. In the examples that follow, the modeling language Business Process Modeling Notation (BPMN) is used as an example of a language that developers and designers may use to create the process model 108. As is known, BPMN provides intuitive, graphical interfaces, with which designers (even non-technical or business designers) may easily create the process model 108. More specifically, the created BPMN-based model may be transformed or converted into a format that is executable by the orchestration engine 114, such as an executable language like BPEL, referenced above, for executing instances of the process model 108 (including the process execution engine 136).

Although FIG. 1 is discussed in terms of business processes associated with the illustrated global process model 102, the business application 106, the local process model 108, as well as the various service and messaging systems, it will be appreciated that FIG. 1 is only an example context. For example, the term business application should be interpreted broadly as including any application that is used in profit generation of some sort, although the business application 106 also may refer to non-profit endeavors as well, including, for example, schools, churches, charities, hospitals, or virtually any other organization. Further, the business application 106 is merely an example, and other applications, such as applications for personal use, also may be used. Consequently, the process execution engine 136 may be used in virtually any scenario in which evaluation of a synchronization point 130 may be needed, especially in the context of more complex synchronization points such as, for example, OR-joins and other complex joins.

Figure 2:
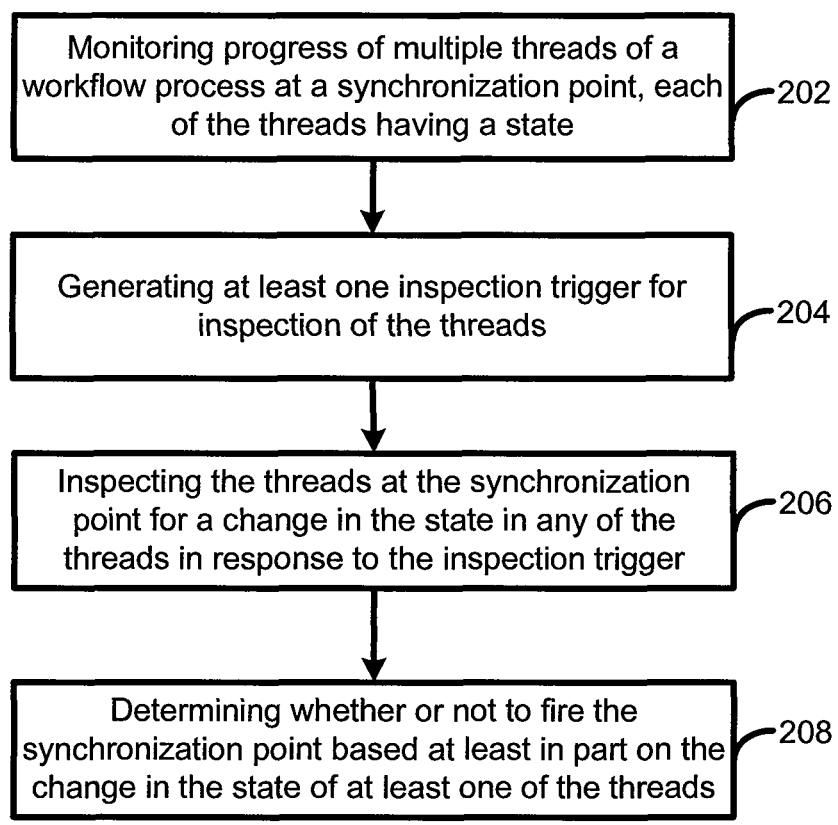
FIG. 2 is a flowchart illustrating example operations of the system of FIG. 1.

FIG. 2 is a flowchart 200 illustrating example operations of the system 100 of FIG. 1. Thus, FIG. 2 again relates to examples associated with the evaluation of one or more synchronization points 130. That is, as described herein, FIG. 2 relates to the evaluation of points in the process model 108, in which multiple branches, such as the incoming branches 132a, 132b, 132c, converge at a single point and a determination is made whether or not to fire the synchronization point or to hold the synchronization point based on the state and/or potential changes of state of the incoming branches following an inspection.

Thus, in FIG. 2, the progress of the multiple threads of the workflow process may be monitored at the synchronization point (202). For example, the orchestration engine 114 may spawn the process execution engine 136 upon the initiation of a process model 108. The thread monitor 138 may monitor the progress of the multiple incoming branches 132a, 132b, 132c flowing into the synchronization point 130 (202). As discussed above, the synchronization point 130 may be different types of synchronization points including, for example, an OR-join or other complex joins. As part of the monitoring process (202), the thread monitor 138 may update and/or populate the thread state data 150.

At least one inspection trigger may be generated for the inspection of the threads (204). For example, the thread monitor 138 may access the trigger point data 152 to assist in determining whether or not to generate an inspection trigger for the inspection of the branches 132a, 132b, 132c. In the example of FIG. 1, the thread monitor may detect that one of the branches 132a has reached a completion state. The trigger point data 152 may include information that states when at least one branch reaches a state of completion, then the thread monitor 138 should generate an inspection trigger (204). As discussed in more detail herein, there may be various types of inspection triggers that may cause the thread monitor 138 to generate an inspection trigger.

In response to the generation of an inspection trigger, the threads may be inspected at the synchronization point for a change in the state in any of the threads (206). For example, the thread inspector 140 may use information from the thread state data 150 and/or the process model data 154 and conduct an inspection in one or more of the threads for a change in the state of the inspected threads. For instance, if the inspection trigger is based on one of the branches 132a reaching a state of completion, the thread inspector 140 may inspect the other non-completed branches 132b, 132c for a potential change in the state of these branches 132b, 132c.

Based at least in part of the change of state of at least one of the threads, it may be determined whether or not to fire the synchronization point (208). For example, the firing rules engine 142 may use the information from the thread inspector 140 in conjunction with the firing rules data 148 and/or the process state data 156 to determine whether or not to fire the synchronization point 130.

Figure 3:
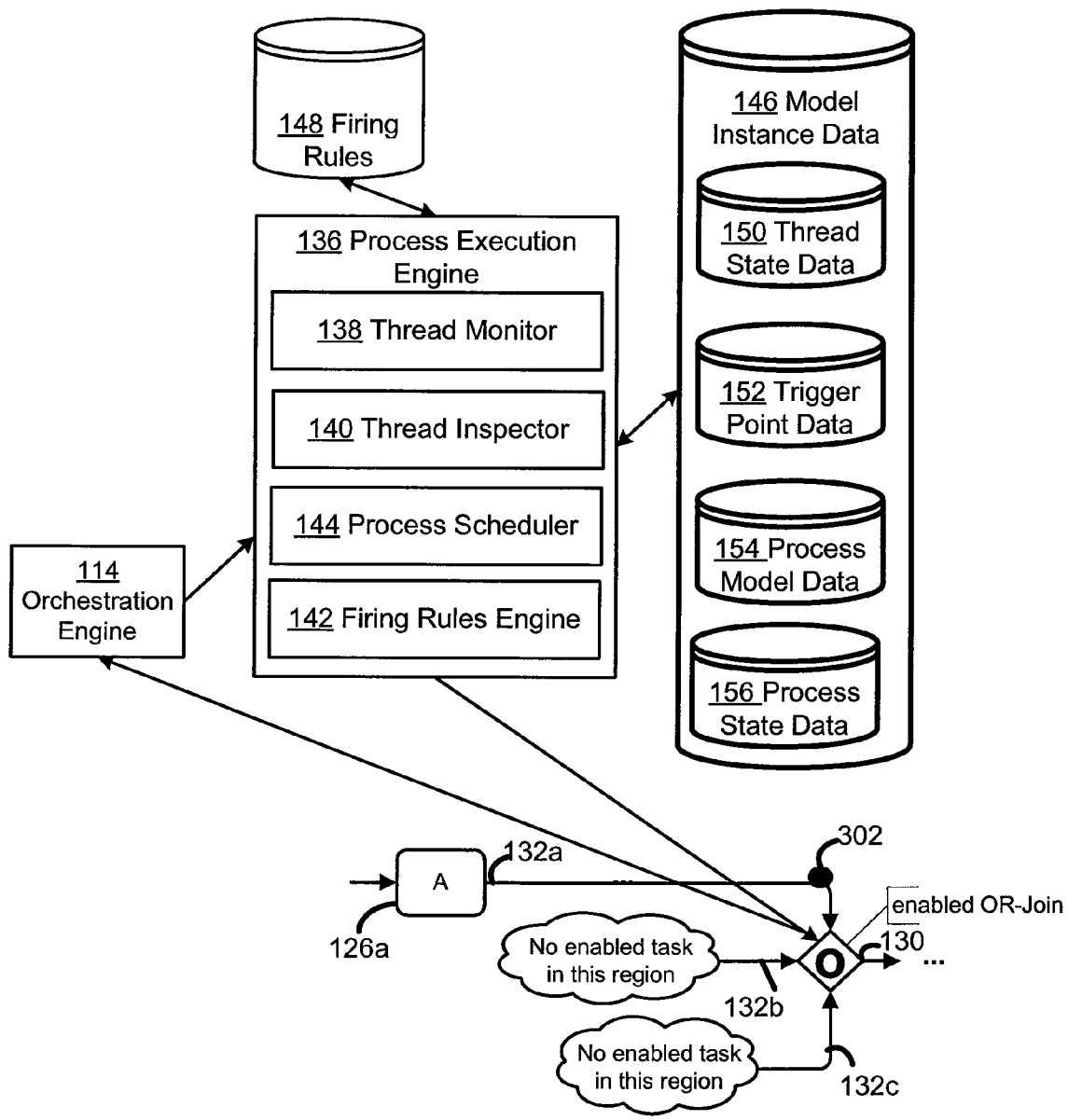
FIG. 3 is a block diagram of an example implementation of the system of FIG. 1.

FIG. 3 is a block diagram 300 of an implementation of the system 100 of FIG. 1. In FIG. 3, several of the elements are the same or similar to elements of FIG. 1, as indicated by like reference numerals. It will be appreciated from FIG. 3, however, that the process execution engine 136 and related elements may be implemented in different environments than the example environment of FIG. 1. For example, the process execution engine 136 need not be associated with some or all of the service 110, messaging infrastructure 112, or global process model 102, or may be implemented with different versions or types of these or other elements of FIG. 1.

In FIG. 3, then, a specific example is illustrated with an OR-join synchronization point 130 that includes three incoming branches 132a, 132b, 132c, with branch 132a associated with task 126a. The other branches 132b, 132c are associated with tasks that are not illustrated in this example. When an instance of this process model is initiated, the orchestration engine 114 may spawn the process execution engine 136 to evaluate the OR-join 130 to determine when the OR-join 130 is enabled and should fire. The process execution engine 136 may reside at the OR-join 130 or, in other cases, may reside elsewhere in the process model.

The thread monitor 138 monitors the state of the branches 132a, 132b, 132c at the OR-join 130. When branch 132a reaches a state of completion, as indicated by the token 302 arriving at the OR-join 130, the thread monitor 138 may generate an inspection trigger. In response to the inspection trigger, the thread inspector 140 may inspect the non-completed branches 132b, 132c to determine whether or not the OR-join 130 should wait for either of these branches 132b, 132c to be enabled before firing. The firing rules engine 142 may place a hold on the OR-join 130 while the thread inspector 140 conducts the inspection of the non-completed branches 132b, 132c. In this example, the thread inspector 140 may check the process model data 154 to find out information relating to the structure of the branches 132b, 132c. Here, the thread inspector 140 determines that no task will be enabled in the region from the branches 132b, 132c. The firing rules engine 142 can use this information along with other information from the firing rules data 148 and process state data 156 to fire the OR-join 130 so that the process model may continue. Here, the thread inspector 140 determined it not to be necessary to wait for branches 132b, 132c to complete because those branches 132b, 132c were in an unreachable state.

The systems of FIGS. 1 and 3 are capable of even more complex evaluations of synchronization points, examples of which are provided below. For example, it may occur that later OR-joins have one or more preceding OR-joins in their path.

Figure 4:
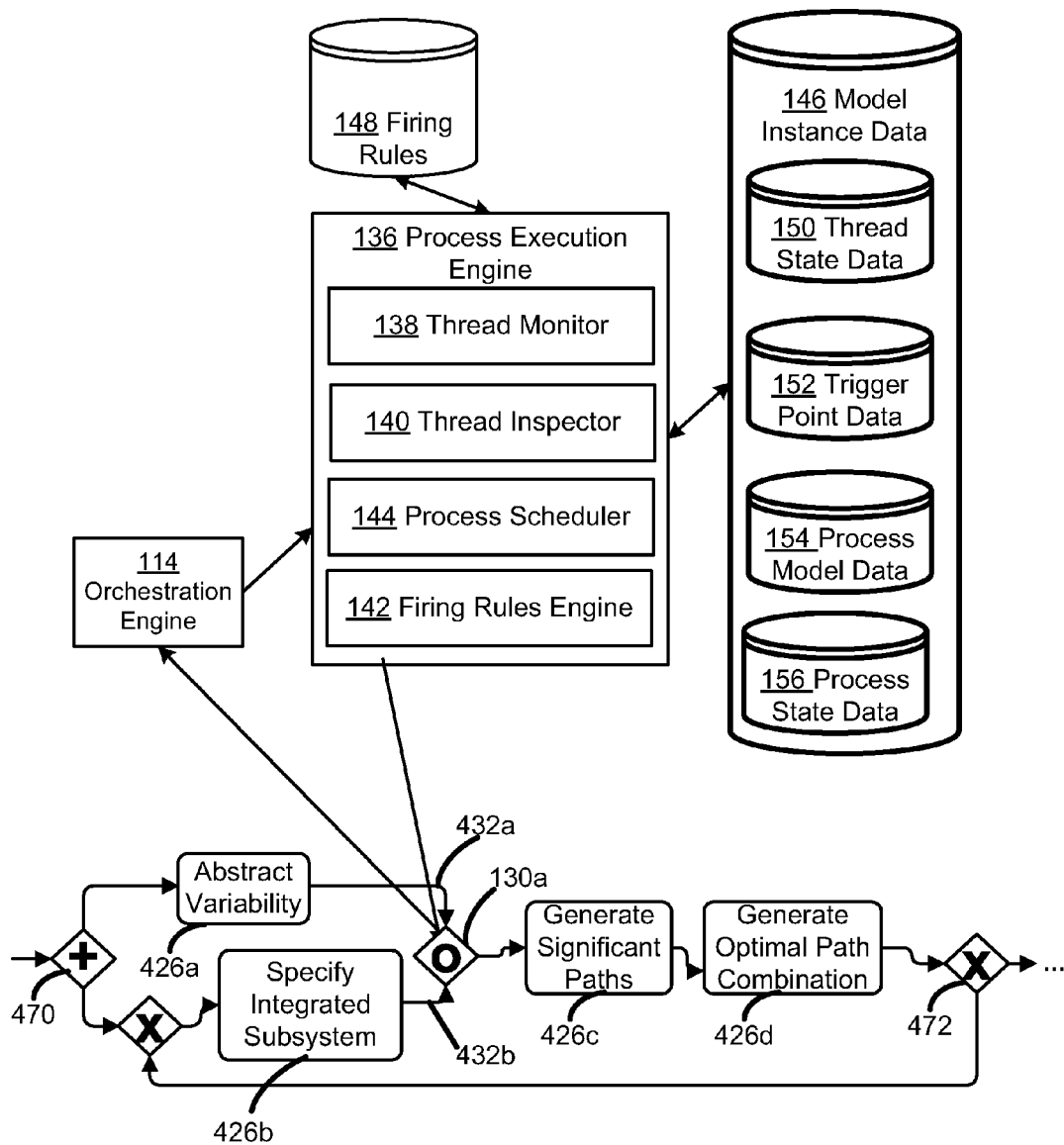
FIG. 4 is a block diagram of an example implementation of the system of FIG. 1.

FIG. 4 is a block diagram 400 of an implementation of the system 100 of FIG. 1. In FIG. 4, several of the elements are the same or similar to elements of FIG. 1, as indicated by like reference numerals. It will be appreciated from FIG. 4, however, that the process execution engine 136 and related elements may be implemented in different environments than the example environment of FIG. 1. For example, the process execution engine 136 need not be associated with some or all of the service 110, messaging infrastructure 112, or global process model 102, or may be implemented with different versions or types of these or other elements of FIG. 1.

In FIG. 4, then, a specific example is illustrated with an OR-join synchronization point 130a that includes two incoming branches 432a, 432b with branch 432a associated with the task "Abstract Variability" 426a and branch 432b associated with the task "Specify Integrated Subsystem" 426b. When an instance of this process model is initiated, the orchestration engine 114 may spawn the process execution engine 136 to evaluate the OR-join 130a to determine when the OR-join 130a is enabled and should fire. The process execution engine 136 may reside at the OR-join 130a or, in other cases, may reside elsewhere in the process model.

The first time this process model is executed, both tasks Abstract Variability 426a and Specify Integrated Subsystem 426b are executed in parallel. This parallel execution is captured by the AND-split gateway 470. The OR-join 130a will then wait for both tasks 426a, 426b to complete before firing the first time. For example, the thread monitor 138 may monitor the progress of the branches 432a, 432b and upon one of the branches (e.g., 432a) reaching a trigger point such as a completed state, as may be specified in the trigger point data 152, the thread monitor 138 may generate an inspection trigger. The thread inspector 140 may then inspect the non-completed branch (e.g., 432b) to determine whether a change of state is possible, as may be specified in the process model data 154. In this first execution of the process model, the thread inspector 140 may designate the branch 432b as being in an active state because a completed state is attainable. Thus, the firing rules engine 142 will hold the OR-join 130a from firing until both of the branches 432a, 432b reach a completed state. Once both of the branches 432a, 432b reach a completed state, then the firing rules engine 142 will fire the OR-join 130a.

Following the firing of the OR-join 130a the first time, the tasks "Generate Significant Paths" 426c and "Generate Optimal Path Combination" 426d may be executed. After completion of this latter task 426d, a choice is made at XOR gateway 472 between repeating task 426b or proceeding with the rest of the process model (not shown in the figure). The process scheduler 144 may update the process state data 156 with information that the process model has completed a first execution. The branches 432a, 432b may be marked with indicators according to the schema that the process scheduler 144 may have in place. If the decision is to repeat task 426b, then when the second execution of the Specify Integrated Subsystem 426b reaches a completed state the OR-join 130a will receive a token along branch 432b. As the thread monitor 138 monitors the branches 432a, 432b during this second execution, the thread monitor 138 may generate an inspection trigger when the branch 432b reaches a completed state. The thread inspector 140 may inspect branch 432a and, using data from the thread state data 150 and the process model data 154, determine that the branch 432a is in an unreachable state. Thus, the firing rules engine 142 may fire the OR-join 130a, because the OR-join 130a does not need to wait on branch 432a in order to fire. Then, the process model may proceed with the rest of the process model.

Figure 5A:
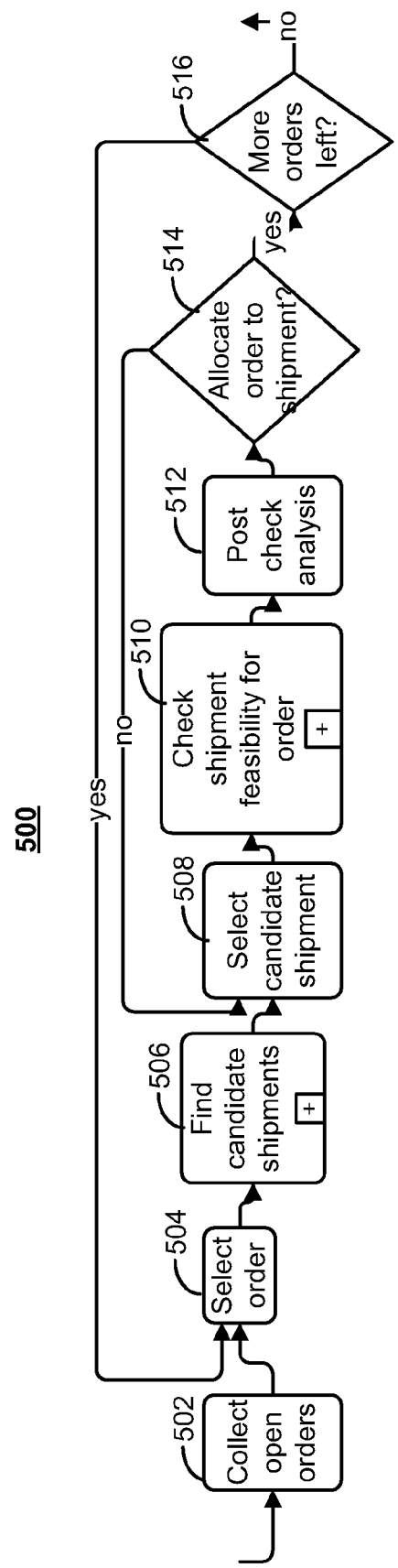
FIGS. 5A and 5B illustrate an example process model that may be used in the system(s) of FIGS. 1, 3 and 4.
Figure 5B:
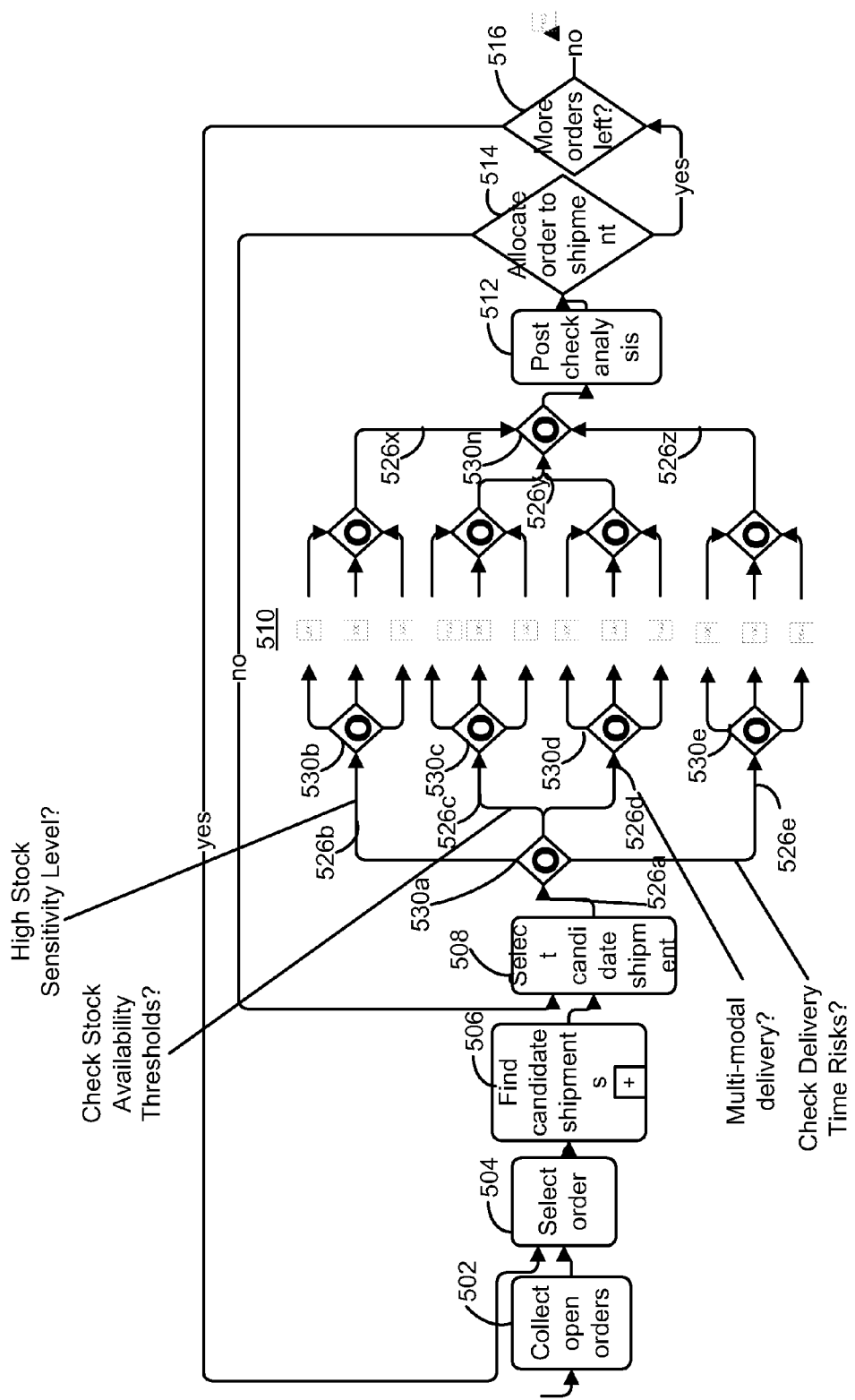

FIGS. 5A and 5B show an example process model 500 that may be used in the system(s) 100/300 of FIGS. 1 and 3. In the example of FIGS. 5A and 5B, an example is provided for allocating ad-hoc order requests to existing shipments. In this example, one of the tasks of FIG. 5A is expanded to show its subroutines and/or sub processes, which includes multiple OR-joins. At each of the OR-joins, a process execution engine 136 from FIG. 1 may be spawned to evaluate whether and when the OR-join should fire. Process model 500 includes multiple tasks including "Collect open orders" 502, "Select order" 504, "Find candidate shipments" 506, "Select candidate shipment" 508, "Check shipment feasibility for order" 510 and "Post check analysis" 512. Two decision points follow the tasks, such that depending on the decision, one or more of the tasks 502-512 may be repeated. The first decision point is "Allocate order to shipment" 514 and "More orders left" 516. As can be seen from this example in FIG. 5B, task 510 "Check shipment feasibility for order" is expanded to illustrate its sub processes.

Upon completion of the task 508, a first OR-join 530a is encountered. In this example, there is a single branch 526a entering the OR-join 530a. The process execution engine 136 and its components and related data may be used to determine when the OR-join 530a is ready to fire. Following the OR-join 530a, then one or more of the multiple branches 526b-526e begin processing, each of which have corresponding OR-joins 530b-530e. As illustrated, task 510 may have other multiple steps that are illustrated by the ellipses, all culminating in three incoming branches 526x, 526y, 526z to OR-join 530n. As described above, process execution engine 136 and its components and related data may be used in the evaluation the OR-join 530n. The example of FIGS. 5A and 5B illustrates the complex level of OR-joins that can be evaluated by the process execution engine 136.

Figure 6:
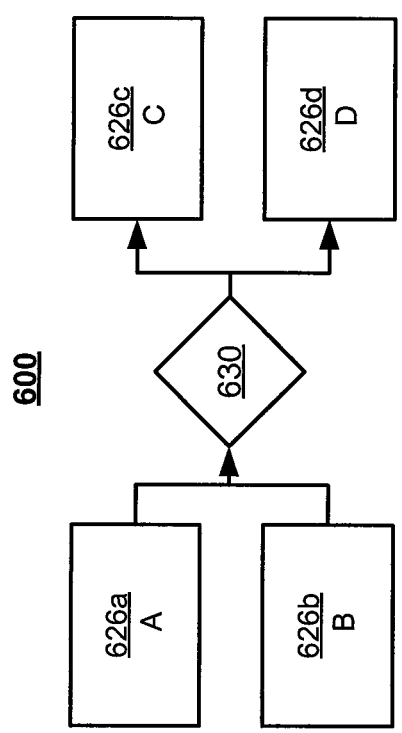
FIG. 6 is a block diagram of an example of a synchronization point that joins a number of threads and diverges into a number of threads.

FIG. 6 illustrates an example block diagram 600, where multiple branches 626a, 626b flow into an OR-join 630 and multiple branches 626c, 626d flow out of the OR-join 630. In this example, and as discussed above with respect to FIG. 1, the firing rules 148 may dictate which of the outgoing branches, 626c, 626d will execute, if any. For example, if branches A 626a and B 626b complete, then the firing rules 148 may dictate that just branch D 626d should be started. Alternatively, for example, if only branch A 626a or branch B 626b completes and the synchronization point 630 fires, then the firing rules 148 may dictate that both branch C 626c and branch D 626d should start. Other possible combinations are possible as may be dictated by the firing rules 148, including the option of no outgoing branches 626c, 626d being started and/or being skipped altogether.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor;
   a non-transitory computer-readable storage medium including instructions executable by the at least one processor, the instructions configured to implement:
      an orchestration engine configured to instantiate a workflow process which includes a synchronization point comprising an OR-join with a plurality of incoming branches, with each of the branches having a state, wherein instantiating the workflow process includes the orchestration engine spawning a process execution engine corresponding to the OR-join to provide incremental evaluation of the OR-join, the incremental evaluation comprising:
         determining a minimum number of the incoming branches which must change to a completion state before the synchronization point could fire, wherein the minimum number is greater than one;
         monitoring the plurality of incoming branches for a change to the completion state;
         generating at least one inspection trigger for inspection of the branches at the OR-join, wherein the generation of the inspection trigger is not initiated until at least a number of the branches equal to the minimum number change to the completion state at the OR-join;
         inspecting the branches at the OR-join in response to the inspection trigger, wherein the inspecting comprises collecting state data for each non-completed branch at the OR-join to determine if the non-completed branch is in an active state and may eventually change to the completion state or is in an unreachable state and will never change to the completion state; and
         determining whether or not to fire the synchronization point based at least in part on the collected state data.

2. The system of claim 1 wherein determining whether or not the synchronization point should fire includes:
   holding the synchronization point while the non-completed branches are being inspected.

3. The system of claim 1 wherein determining whether or not to fire the synchronization point comprises firing the synchronization point when each of the incoming branches is determined to be in one of the completion state and the unreachable state.

4. The system of claim 1 wherein determining whether or not to fire the synchronization point comprises holding the synchronization point when any of the incoming branches are determined to be in the active state.

5. The system of claim 1 wherein the incremental evaluation further comprises repeating the inspection of the incoming branches after a configurable period of time.

6. The system of claim 1 wherein the inspecting further comprises performing a backward search of the workflow process along each of the non-completed branches.

7. The system of claim 6 wherein performing the backward search comprises:
   encountering one or more predecessor synchronization points of the workflow process; and
   determining an enablement state of the one or more predecessor synchronization points.

8. The system of claim 7 wherein determining the enablement state of a predecessor synchronization point comprises recursively performing the incremental evaluation process when the predecessor synchronization point is an OR-join.

9. The system of claim 1 further comprising a process scheduler that is arranged and configured to cause the at least one processor to update a state of the OR-join and configured to cause the at least one processor to update a state of the workflow process.

10. The system of claim 1 wherein:
    the OR-join includes multiple outgoing branches; and
    firing the synchronization point comprises activating one or more of the outgoing branches including determining which of the outgoing branches to activate based on the state of the incoming branches.

11. A method comprising:
    instantiating, by an orchestration engine, a workflow process which includes a synchronization point comprising an OR-join with a plurality of incoming branches, with each of the branches having a state, wherein instantiating the workflow process includes the orchestration engine spawning a process execution engine corresponding to the OR-join to provide incremental evaluation of the OR-join, the incremental evaluation comprising:
       determining a minimum number of the incoming branches which must change to a completion state before the synchronization point could fire, wherein the minimum number is greater than one;
       monitoring the plurality of incoming branches for a change to the completion state;
       generating at least one inspection trigger for inspection of the branches at the OR-join, wherein the generation of the inspection trigger is not initiated until at least a number of the branches equal to the minimum number change to the completion state at the OR-join;

inspecting the branches at the OR-join in response to the inspection trigger, wherein the inspecting comprises collecting state data for each non-completed branch at the OR-join to determine if the non-completed branch is in an active state and may eventually change to the completion state or is in an unreachable state and will never change to the completion state; and determining whether or not to fire the synchronization point based at least in part on the collected state data.

12. The method of claim 11 wherein determining whether or not to fire the synchronization point comprises firing the synchronization point when each of the incoming branches is determined to be in one of the completion state and the unreachable state and holding the synchronization point when any of the incoming branches are determined to be in the active state.

13. A computer program product for evaluating synchronization points in process models, the computer program product comprising a non-transitory computer-readable medium including executable code that, when executed, is configured to cause at least one data processing apparatus to execute an orchestration engine, the orchestration engine configured to:

instantiate a workflow process which includes a synchronization point comprising an OR-join with a plurality of incoming branches, with each of the branches having a state, wherein instantiating the workflow process includes the orchestration engine spawning a process execution engine corresponding to the OR-join to provide incremental evaluation of the OR-join, the incremental evaluation comprising:

determining a minimum number of the incoming branches which must change to a completion state before the synchronization point could fire, wherein the minimum number is greater than one;

monitoring the plurality of incoming branches for a change to the completion state;

generating at least one inspection trigger for inspection of the branches at the OR-join, wherein the generation of the inspection trigger is not initiated until at least a number of the branches equal to the minimum number change to the completion state at the OR-join;

inspecting the branches at the OR-join in response to the inspection trigger, wherein the inspecting comprises collecting state data for each non-completed branch at the OR-join to determine if the non-completed branch is in an active state and may eventually change to the completion state or is in an unreachable state and will never change to the completion state; and determining whether or not to fire the synchronization point based at least in part on the collected state data.

14. The computer program product of claim 13 wherein determining whether or not to fire the synchronization point comprises firing the synchronization point when each of the incoming branches is determined to be in one of the completion state and the unreachable state and holding the synchronization point when any of the incoming branches are determined to be in the active state.

15. The computer program product of claim 14 wherein:
the OR-join includes multiple outgoing branches; and
firing the synchronization point comprises activating one or more of the outgoing branches including determining which of the outgoing branches to activate based on the state of the incoming branches.

* * * * *